(12) United States Patent
Gupta

(10) Patent No.: US 6,462,739 B1
(45) Date of Patent: Oct. 8, 2002

(54) CURVE SMOOTHING WITHOUT SHRINKING

(75) Inventor: Naresh Chand Gupta, Lucknow (IN)

(73) Assignee: Abode Systems Incorporated, San Jose, CA (US)

( * ) Notice: Subject to any disclaimer, the term of this patent is extended or adjusted under 35 U.S.C. 154(b) by 0 days.

(21) Appl. No.: 09/272,237

(22) Filed: Mar. 18, 1999

(51) Int. Cl.⁷ .............................................. G06T 11/20
(52) U.S. Cl. ..................................................... 345/442
(58) Field of Search ............................... 345/442, 441; 382/269, 266

(56) References Cited

U.S. PATENT DOCUMENTS 6,100,904 A * 8/2000 Gupta ......................... 345/442
6,256,039 B1 * 7/2001 Krisnamurthy ............. 345/420
6,271,856 B1 * 8/2001 Krisnamurthy ............. 345/429

OTHER PUBLICATIONS

A. Blake, et al., "Weak Continuity Constraints Generate Uniform Scale–Space Descriptions of Plane Curves" Dept. Of Computer Science, Scotland, (date unavailable).
Richard L. Burden, et al., *Numerical Analysis*, Second Edition, Chapter 9 (Numerical Solutions of Nonlinear Systems of Equations), 1981, pp. 439–461.
Andrew Blake, et al., *Visual Reconstruction*, Chapter 2 (Applications of Piecewise Continuous Reconstruction), 1987, pp. 16–36.
Adobe Systems, Inc., "Technical Note #5012", *The Type 42 Font Format Specification*, Mar. 1, 1993.
Adobe Systems, Inc., "Technical Note #5092", *CID–Keyed Font Technology Overview*, Sep. 12, 1994.
Adobe Systems, Inc., "Technical Specification #5014, Version 1.0", *Adobe CMap and CIDFont Files Specification*, Oct. 16, 1995.
Projective Solutions, Inc., *ScanLab manual*, Apr. 8, 1990.
U.S. Patent Application Ser. No. 08/882,695, filed Jun. 25, 1997, Characterization of Corners of Curvilinear Segment.
U.S. Patent Application Ser. No. 08/882,692, filed Jun. 25, 1997, Curvature Smoothing.

* cited by examiner

*Primary Examiner*—Jeffery Brier
*Assistant Examiner*—Anthony J. Blackman
(74) *Attorney, Agent, or Firm*—Fish & Richardson P.C.

(57) ABSTRACT

A system generates a smoothed curve from a noisily drawn, multi-segmented curve by minimizing an energy function for a smoothed curve which fits between end-points of the drawn curve. The energy function has three components: a distortion component, a smoothing component and a shrink component. Numerical analysis methods are applied to evaluate the energy function and to identify the smoothed curve with the lowest energy. The transposed curve with the lowest energy value is selected as the smoothed curve.

51 Claims, 5 Drawing Sheets

CURVE SMOOTHING WITHOUT SHRINKING

BACKGROUND

The invention relates to smoothing a drawn curve which is rendered by a computer.

The generation and maintenance of diagrams on a computer typically require computer aided design (CAD) tools and graphics illustration software. In this process, users typically select one or more objects and place each object on a drawing sheet displayed on a monitor or other suitable display device. Users can also edit and manipulate these objects to achieve the desired appearance. To aid users in performing their lay-out tasks to generate digital drawings, common symbols or objects such as squares, rectangles, circles, and ovals, among others, are typically provided for the user to select and manipulate in creating at the design. Further, tools are also available to assist the user in drafting straight lines and curvilinear segments on the digital drawings.

The process of digitally drawing lines or curves is generally a trial and error process, especially when the curve is made up of a number of corners or segments. Attempts at drawing curves with multiple corners or segments generally result in curves which look noisy. The noise manifests itself as a sequence of jagged curves, each of which is defined by begin and end points. In addition to being visually undesirable, the editing, displaying and saving of the sequence of jagged curves can become quite complex. Thus, to improve the visual appearance and simplify the manipulation of noisy curves, it is desirable to use smoothed versions in lieu of the noisy curves.

The noise can be eliminated by suitable smoothing operations on the curves. To prevent distorting the shape of the curve, the smoothing operations need to preserve corners of the drawn curve. Potential distortions include rounding of the corners or shrinking of the curve which can be easily perceived by human observers.

Generally, given a path or curve represented by a set of points, the path can be smoothed using several techniques. One technique called a parametric technique fits one or more polynomials to a number of data points associated with the path. However, the parametric technique requires an a priori knowledge of an appropriate polynomials to use in fitting the data points. Further, the parametric technique does not preserve path corners.

A non-parametric technique can be used to reconstruct the curve. Generally, the non-parametric technique defines constraints that encompass data fidelity and smoothness requirements. An energy function is then defined in terms of the fidelity and smoothness constraints, and a path is constructed to approximate the curve which minimizes the energy function. The energy value is a composite of a number of factors, as follows:

$$E = D + \lambda^2 * S$$

where D represents the distortion factor;
$\lambda$ is the smoothness parameter and larger values of $\lambda$ indicating greater smoothness; and
S is a smoothness function.

Additional factors or constraints can be imposed to achieve certain curve characteristics. One such constraint can be that the average departure of the transposed curve from the drawn curve be zero. This can be imposed as $$\Sigma(x_i - u_i) = 0$$
$$\Sigma(y_i - v_i) = 0$$

Numerical methods are applied to evaluate the smoothing function and to identify the transposed curve with the minimal energy which fits between end-points of the drawn curve. The transposed curve with the lowest energy value E is selected as the smoothed curve.

SUMMARY

In general, the invention features a computer-implemented apparatus and method for smoothing a curve. The apparatus generates a smoothed curve from a noisily drawn, multi-segmented curve by minimizing an energy function for a transposed curve which fits between end-points of the drawn curve. The energy function has three components: a distortion component, a smoothing component and a shrink component. Numerical analysis methods are applied to evaluate the energy function and to identify the transposed curve with the lowest energy. The transposed curve with the lowest energy value is selected as the smoothed curve.

In one aspect, the apparatus generates a smoothed curve from a drawn curve by defining an energy constraint associated with the drawn curve, the energy constraint having a shrink component, a distortion component, and a smoothness component; and generating the smoothed curve by minimizing the energy constraint.

Implementations of the invention include one or more of the following. The energy constraint E may be expressed as:

$$E = D + \lambda^2 * S + \gamma^2 * B$$

where D is the distortion component, $\lambda$ is a smoothness parameter, S is the smoothness component, $\gamma$ is a shrink parameter and B is the shrink component. The shrink component may be defined as a function of the area enclosed between the drawn curve and the smoothed curve. The shrink component may also be defined as the square of the area enclosed between the drawn curve and the smoothed curve. The drawn curve includes one or more points and the smoothed curve includes one or more corresponding transposed points, further comprising approximating the enclosed area as the sum of areas enclosed between consecutive points on the drawn curve and the corresponding transposed points. The area enclosed between consecutive points on the drawn curve and the corresponding transposed points is determined by:

$$\text{Area}_i = (x_{i+1} - x_i, y_{i+1} - y_i) \times (u_i - x_i, v_i - y_i)$$

where $(x_i, y_i)$ represent a point on the drawn curve, $(u_i, v_i)$ represent a point on the smoothed curve, and X is the vector cross product.

The area enclosed between consecutive points on the drawn curve and the corresponding transposed points may also be determined by:

$$\text{Area}_i = (x_{i+1} - x_i, y_{i+1} - y_i) \times ((u_i - x_i, v_i - y_i) + (u_{i+1} - x_{i+1}, v_{i+1} - y_{i+1})).$$

The energy constraint may be minimized using a gradient descent method.

In another aspect, a computer system characterizes a drawn curve defined by a sequence of points on a two-dimensional space. The computer includes a display, a user input device, and a processor coupled to the display and the user input device. The processor has instructions embedded therein to:

determine a distortion component D associated with the smoothed curve in accordance with $$D = \sum_{i=0}^{N-1} ((u_i - x_i)^2 + (v_i - y_i)^2)$$

where $(x_i, y_i)$ represent a point on the drawn curve $(u_i, v_i)$ represent a point on the smoothed curve;

determine a smoothing component S associated with the smoothed curve in accordance with:

$$S = \sum_{i=0}^{N-1} \sqrt{(u_i - u_{i+1})^2 + (v_i - v_{i+1})^2}$$

determine a shrink component B for a systematic shift in accordance with:

$$B = \left[ \sum_{i=1}^{N-1} (v_i \cdot l_i + u_i \cdot m_i) + M \right]^2$$

and generate one or more smoothed curves, each curve having an energy value E expressed in terms of the distortion component, the smoothing component and the shrink component in accordance with:

$$E = D + \lambda^2 * S + \gamma^2 * B$$

where $\lambda$ is the smoothness parameter, $\gamma$ is the distortion parameter; and select the smoothed curve with the minimum energy as the smoothed curve.

In another aspect, computer-implemented method generates a smoothed curve from a drawn curve by defining a function for one or more signed areas between the smoothed curve and the drawn curve; and generating the smoothed curve by applying the function as a constraint.

In another aspect, an apparatus for generating a smoothed curve from a drawn curve includes means for defining a function for one or more signed areas between the smoothed curve and the drawn curve; and means for generating the smoothed curve by applying the function as a constraint.

In yet another aspect, an apparatus for generating a smoothed curve from a drawn curve, includes means for defining an energy constraint associated with the drawn curve, the energy constraint having a shrink component, a distortion component, and a smoothness component; and means for generating the smoothed curve by minimizing the energy constraint.

Among the advantages of the invention are one or more of the following. The resulting curve, as generated by the invention, is smooth without any noise artifacts when viewed. The smoothness of the resulting curve is achieved without affecting the overall shape of the curve and without shrinking the curve's radius. The jaggedness of the curve is reduced without flattening the curve. The invention generates an accurate characterization of the curve.

Other features and advantages of the invention will become apparent from the following description and from the claims.

DETAILED DESCRIPTION

Figure 1:
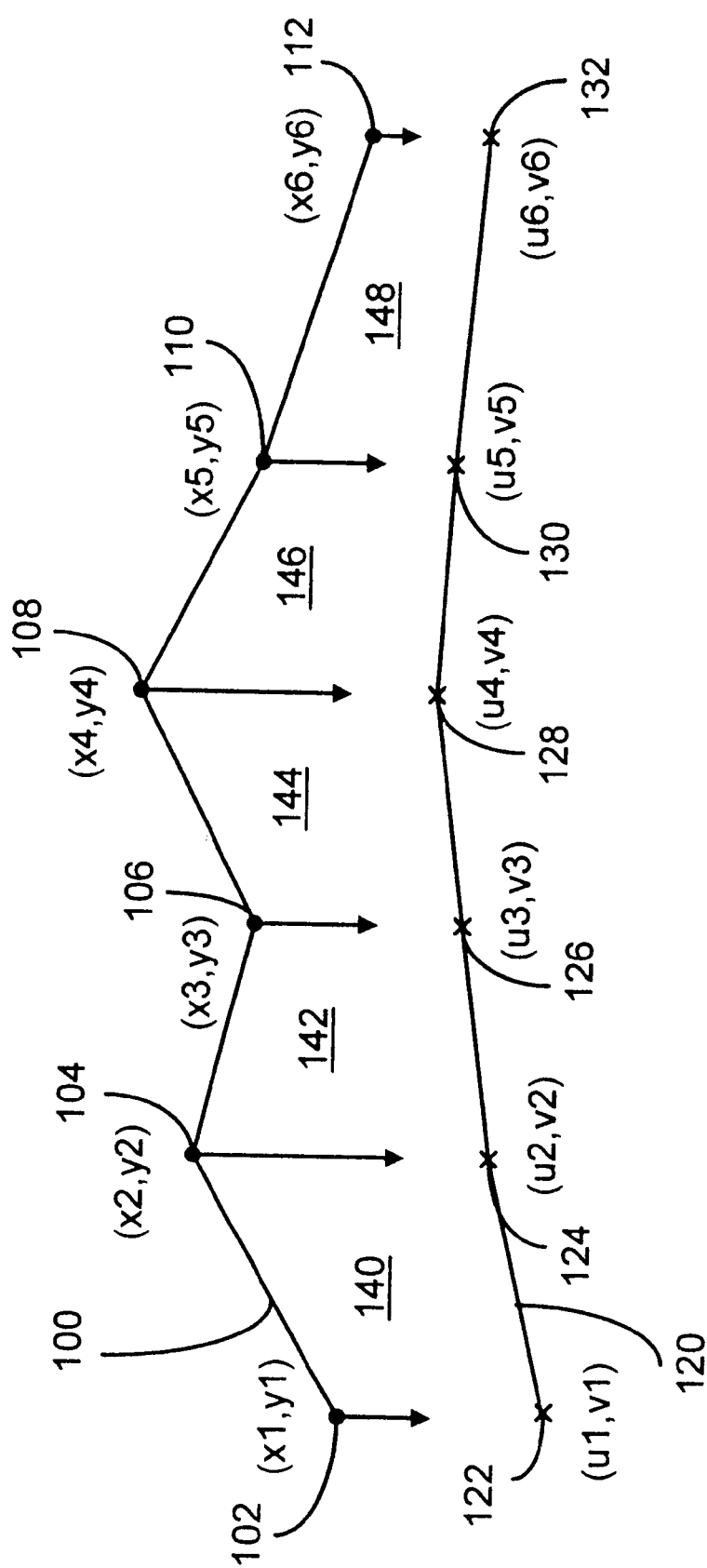
FIG. 1 shows an exemplary curve which is to be smoothed.

FIG. 1 illustrates an exemplary drawn segment or curve 100 which needs to be smoothed. The drawn segment or curve 100 has a plurality of points 102, 104, 106, 108, 110 and 112. The points 102-112 contain noise or perturbation inadvertently introduced during the drawing of the curve 100 by a user.

A synthesized or transposed smooth curve 120 has points 122, 124, 126, 128, 130 and 132 which correspond to points 102 and 104, 106, 108, 110 and 112, respectively. A region 140 is defined between points 102, 122, 124, and 104, a region 142 is defined between points 104, 124, 126, and 106, a region 144 is defined between points 106, 126, 128, and 108, and a region 146 is defined between points 108, 128, 130, and 110, and a region 148 exists between points 110 130, 132, and 112, respectively.

In the example of FIG. 1, all smoothed points 122–132 exist on one side of the data points 102–112. This characteristic causes a shrinkage of the radius of the smoothed curve 120 to occur. Shrinkage typically occurs in areas of high curvature where small shifts of all points on one side of the curve reduces the length of the curve significantly. The reason for this is that, though the smoothing process data fidelity constraint requires the smoothed points 122–132 to be close to the original points 102–112, the process for generating a smooth curve does not consider which side the point moves, but only considers a cumulative error measure. Since the error measure is small, if all points are moved by a small amount to one side, the smoothing process picks one of these curves as optimal and along the way generates a smooth shrinked curves. For instance, if the original path is a circle of a radius 'r', the smoothed path is a circle with a radius which is less than 'r'.

Figure 2:
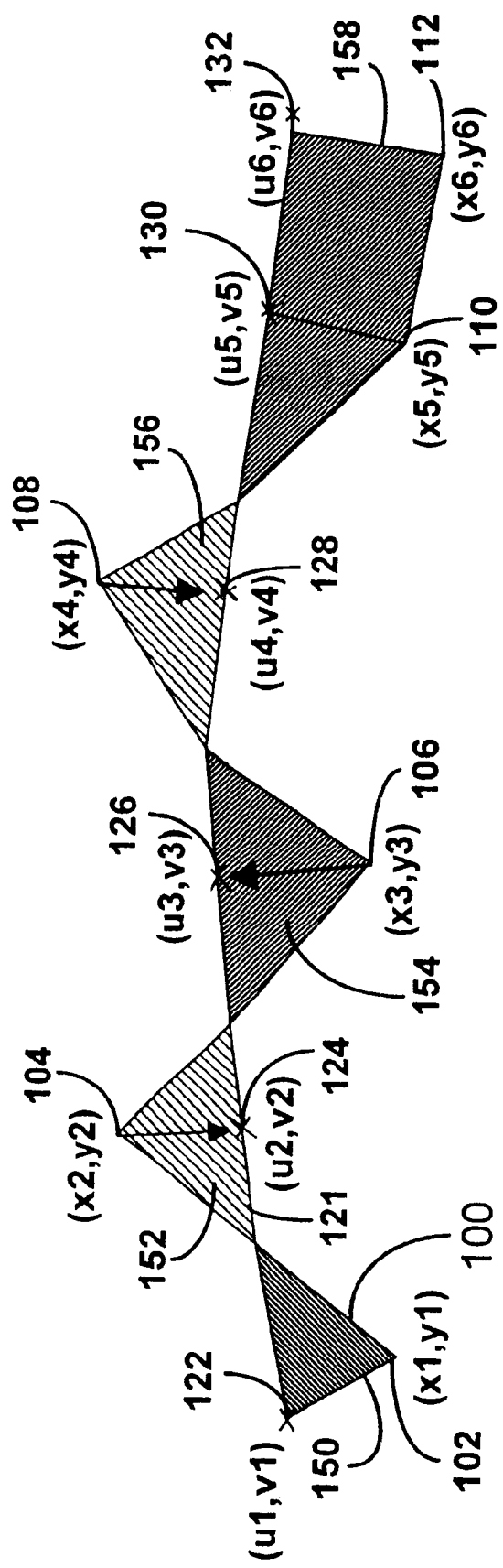
FIG. 2 shows a smoothed curve synthesized from the curve of FIG. 1.

FIG. 2 shows the segment or curve 100 and a second smoothed curve 121 which illustrate the operation of a process 200 (FIG. 4) in generating the smoothed curve 121 without shrinkage. The process 200 adds an additional data fidelity constraint which imposes a penalty when significant points shift to one side. As in FIG. 1, original data points 102–112 are used to generate corresponding points 122–132 on the smoothed curve 121. The smoothed curve 121 straddles the original data points 102–112 such that points 122 and 124 are approximately centered between points 102 and 104. Similarly, points 126 and 128 are approximately centered between points 106 and 108, and so forth. The process of FIG. 4 thus analyzes areas 150–158 enclosed between the original curve 100 and the smoothed curve 121 and computes a net area, as discussed below. If the areas on either side of the original curve 100 have opposite signs, then in case of a systematic shift (or shrinking) occurring during smoothing, areas 140–148 have the same sign and hence the net area will be large number. In contrast, when the smoothed data points 122–132 are evenly shifted, the areas on either side will even out and the net area will be close to zero.

Figure 3:
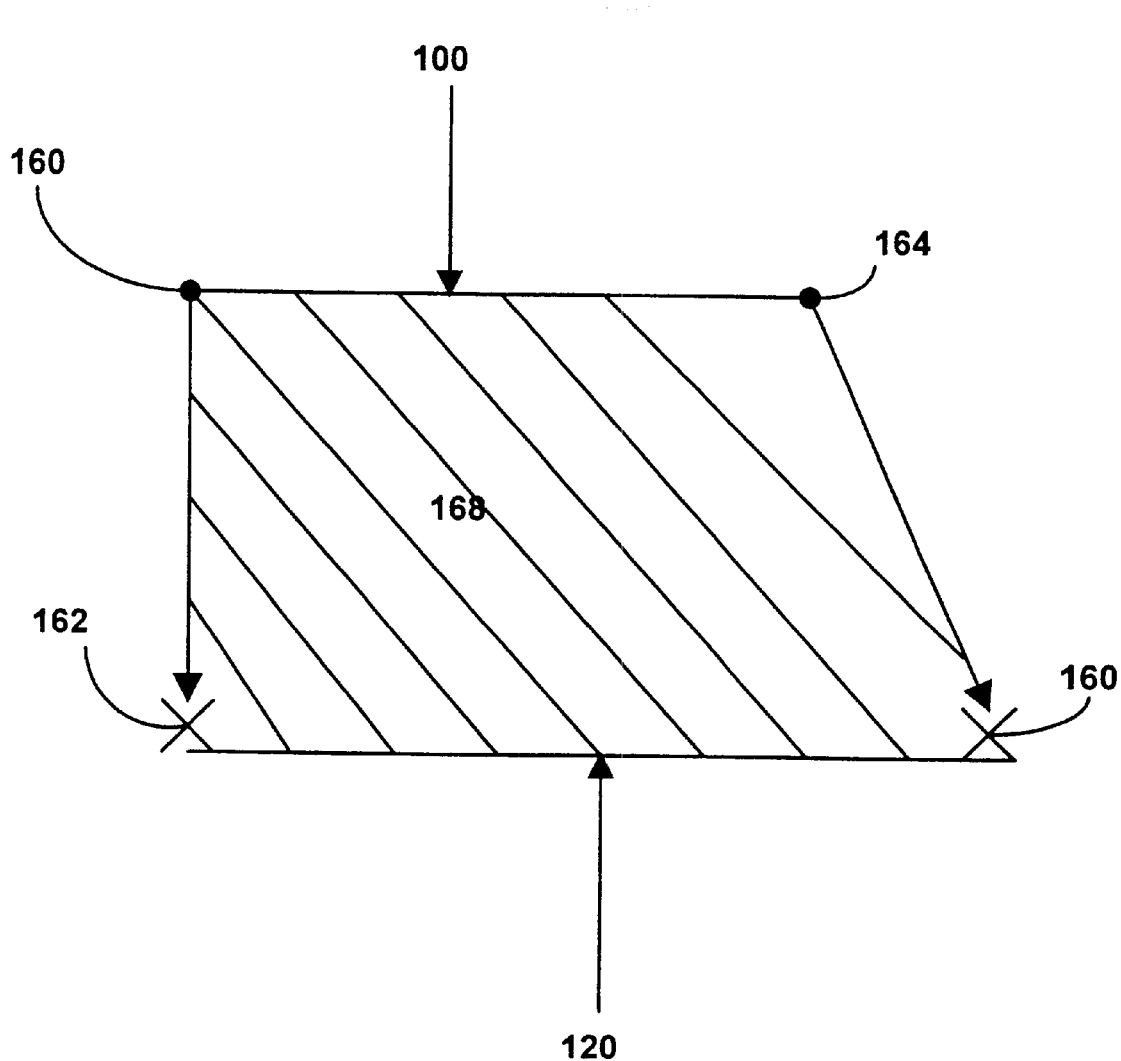
FIG. 3 illustrates an area between two successive points the curve of FIG. 2.

The process 200 then determines a smoothing function defining the transposed smoothed curve 121 located between the curve end points (points 160 and 164 of FIG. 3) of the drawn curve 100. During the smoothing process, points representing perturbations are projected closer together by the smoothing function, effectively reducing the overall length of the smoothed curve 121. As discussed in more detail below, by finding a smoothing function which minimizes the energy associated with the curve 121 and by considering an error term associated with a net area 168, the drawn curve 100 is transposed into the smoothed curve 121 with points 162 and 166.

Figure 4:
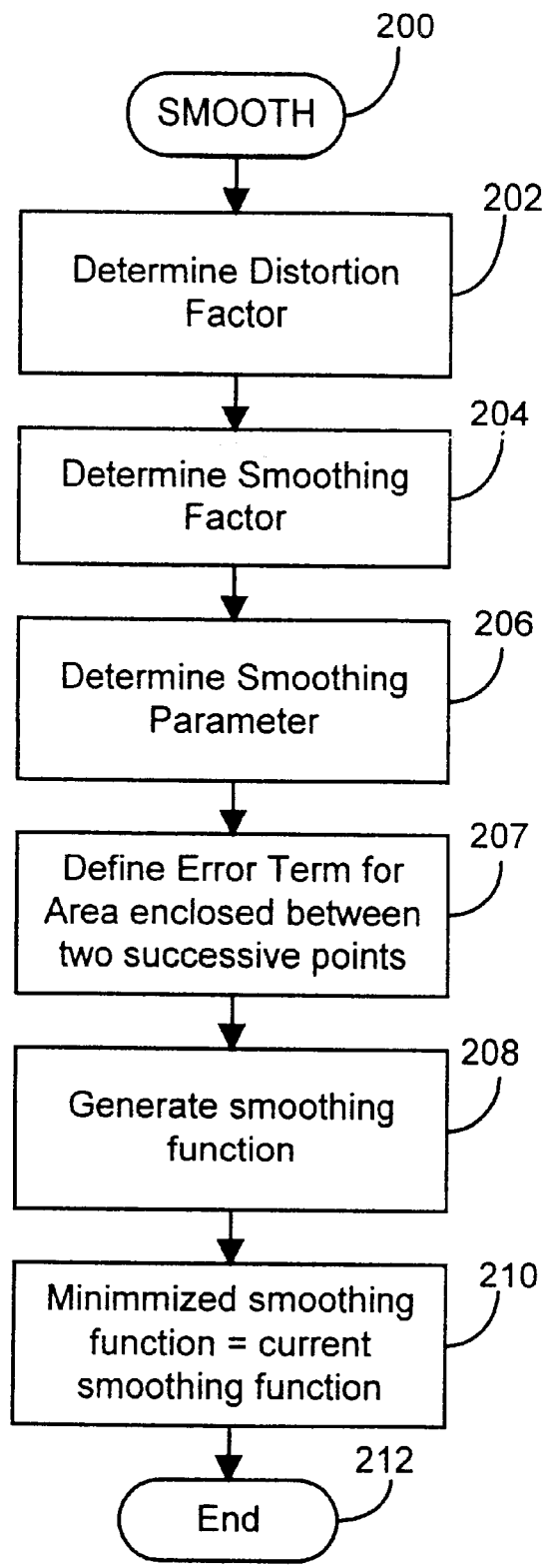
FIG. 4 is a flow chart of a process of smoothing the curve of FIG. 1.
Figure 5:
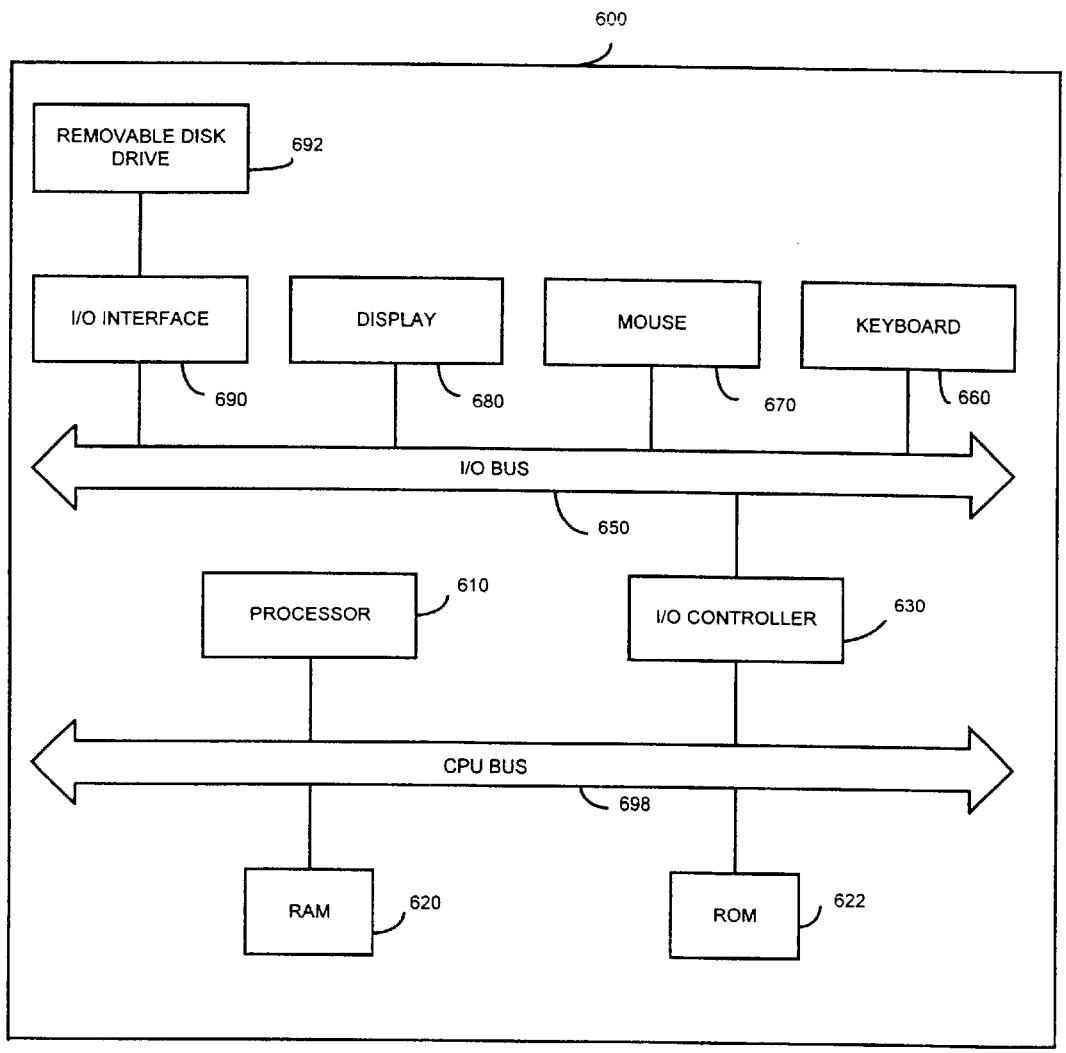
FIG. 5 illustrates a computer system suitable for use with the invention.

Referring now to FIG. 4, the process 200 for smoothing a curve without shrinking the curve is detailed. In general, the process 200 attempts to find the transposed smoothed curve 120 from the originally drawn curve 100. The smoothed curve 120 is associated with an energy value E which advantageously is related to the length of the transposed smoothed curve 120, although other characterizations for E can be used.

The transposed curve 120 is a mapping of coordinate (x,y) for each point I on the drawn curve 100 to coordinate (u,v) on the smoothed curve 121, subject to a constraint that the energy value for the smoothed curve 121 is minimized as the lowest energy E value. The energy value E is expressed as:

$$E = D + \lambda^2 * S + \gamma^2 * B$$

In step 202, the process 200 determines a distortion factor D to be used in the analysis of E. The distortion factor D is a measure of the movement of the transposed curve from the original curve. A number of characterization of D may be used, including characterizing D as a function of the actual or the square of the difference in distance between the points on the curves.

In one embodiment, D is expressed as the sum of the square of the distance between point I on the drawn curve and on the transposed curve, as follows:

$$D = \sum_{i=0}^{N-1} ((u_i - x_i)^2 + (v_i - y_i)^2)$$

where D is a function of the sum of the square of the distance between point I on the drawn curve, represented as $(x_i, y_i)$ and on the transposed curve, represented as $(u_i, v_i)$. Alternatively, D may be expressed as the sum of the distance between point I on the drawn curve and on the transposed curve:

$$D = \sum_{i=0}^{N-1} \sqrt{(u_i - x_i)^2 + (v_i - y_i)^2}$$

Other methods of characterizing D include expressing D as a function of the area between the original curve and the transposed curve, among others.

After the distortion factor D has been determined (step 202), the method determines a smoothing factor S in step 204. S is expressed as a sum of the square of the length of each segment on the transposed curve as follows:

$$S = \sum_{i=0}^{N-1} ((u_i - u_{i+1})^2 + (v_i - v_{i+1})^2)$$

Alternatively, S may be expressed as a function of the length of the transposed curve:

$$S = \sum_{i=0}^{N-1} \sqrt{(u_i - u_{i+1})^2 + (v_i - v_{i+1})^2}$$

Next, the method determines a smoothing parameter $\lambda$ in step 206. $\lambda$ is a user selectable value. If $\lambda$ is set to 0, the smoothed curve will mimic the original drawn curve faithfully. If $\lambda$ is set at infinity, the smoothed curve will be a straight line joining the two end points.

In step 207, the process of FIG. 4 defines another data fidelity constraint to prevent shrinking. This constraint is an expression of the area enclosed between the drawn and the transposed smoothed curve. This can be computed as the sum of the area enclosed between two successive points. The enclosed area is computed as follows:

Enclosed Area=ΣSigned area between two successive points

The exact expression for the enclosed area is quite complicated and makes the energy minimization process intractable. Hence, an approximation to the enclosed area is used. The main criteria imposed on the approximation is that it be linear in $(u_i, v_i)$ such that the error function is still computationally tractable. A few examples of approximating the net area is discussed below, but any other suitable approximations will work equally well.

In a first approximation, the area segment is computed as:

$$\text{Area}_i = (x_{i+1} - x_i, y_{i+1} - y_i) \times (u_i - x_i, v_i - y_i)$$

where,

X is the vector cross product.

The above approximation computes the signed area of a parallelogram between line connecting a point I to a point I+1, and a line connecting a point I to a smoothed point I.

In a second approximation, the area segment is computed as follows:

$$\text{Area}_i = (x_{i+1} - x_i, y_{i+1} - y_i) \times ((u_i - x_i, v_i - y_i) + (u_{i+1} - x_{i+1}, v_{i+1} - y_{i+1}))$$

The second approximation is the sum of the area spanned by a line connecting point I and I+1, and a line connecting point I to its smoothed point, and a line connecting point I+1 to its smoothed point.

$$\text{Area} = \sum_{i=1}^{N-1} \text{Area}_i$$

$$= \sum_{i=1}^{N-1} [(x_{i+1} - x_i, y_{i+1} - y_i) X (u_i + u_{i+1} - x_i - x_{i+1}, v_i + v_{i+1} - y_i - y_{i+1})]$$

-continued $$= \sum_{i=1}^{N-1} [(x_{i+1} - x_i) \cdot (v_i + v_{i+1} - y_i - y_{i+1}) - (y_{i+1} - y_i) \cdot (u_i + u_{i+1} - x_i - x_{i+1})]$$

$$= \sum_{i=1}^{N-1} [v_i \cdot (x_{i+1} - x_{i-1}) - u_i \cdot (y_{i+1} - y_{i-1}) + (x_i + x_{i+1}) \cdot (y_{i+1} - y_i) - (x_{i+1} - x_i) \cdot (y_i + y_{i+1})]$$

$$= \sum_{i=1}^{N-1} [v_i \cdot l_i + u_i \cdot m_i] + M$$

$$= P$$

where, $$l_i = x_{i+1} - x_{i-1}$$

$$m_i = y_{i-1} - y_{i+1}$$

$$M = \sum_{i=1}^{N-1} [(x_i + x_{i+1}) \cdot (y_{i+1} - y_i) - (x_{i+1} - x_i) \cdot (y_i + y_{i+1})].$$

The energy function then becomes:

$$E = D + \lambda^2 * S + \gamma^2 * B$$

$$= \sum_{i=0}^{N-1} \left[ (u_i - x_i)^2 + (v_i - y_i)^2 + \lambda^2 \sqrt{(u_{i+1} - u_i)^2 + (v_{i+1} - v_i)^2} \right] +$$

$$\gamma^2 \left[ \sum_{i=1}^{N-1} (v_i \cdot l_i + u_i \cdot m_i) + M \right]^2$$

Thus, the process 200 defines the way to compute the new curve where the energy function E contains three terms:
1. Closeness of the resulting curve to the data curve;
2. Smoothness of the resulting curve; and
3. Constraint for a systematic shift.

The smoothed curve 121 is obtained by minimizing this energy function.

The parameter $\gamma$ is assigned large values (and thus prevents the shrinking from happening), when there is a systematic shift. When the new constraint is introduced and the new established cure is recovered, the constraint ensures that no systematic shift can occur. For a given curve and its smoothed version, if the measure "enclosed area" between the two curves is large then it implies that the systematic shift has occurred.

The process 200 ensures that the reconstructed curve 121 is distributed evenly around the original curve 100. In process 200, the area covered between the data points 160 and 164 and the reconstructed point 162 and 166 is examined. The area is defined on one side to be positive and other side to be negative. The constrain requires that total area between these two curves on one side be equal to the total area between these two curves on the other side. For the enclosed area to be small, the smoothed curve should lie on both sides of the data or distributed around the given curve 100 (some points on one side and other on the other side). If the smoothed curve 121 lies only on one side, then the systematic shift has occurred. Restated, the area covered between the two curves (the original noisy curve 100 and the smoothed curve 121) should be small or ideally zero.

In step 208, a smoothing function with an energy value E is generated which is representative of the transposed curve. As E is a composite of various factors, it can be written as:

$$E = D + \lambda^2 * S + \gamma^2 * B.$$

One embodiment of E can be expressed as:

$$E = \sum_{i=0}^{N-1} \left[ (u_i - x_i)^2 + (v_i - y_i)^2 + \lambda^2 \sqrt{(u_{i+1} - u_i)^2 + (v_{i+1} - v_i)^2} \right] +$$

$$\gamma^2 \left[ \sum_{i=1}^{N-1} (v_i \cdot l_i + u_i \cdot m_i) - M \right]^2$$

Other suitable combinations using D and S may be used as well.

Next, in step 210, the smoothed curve is obtained by solving the 2N-2 equations representing the first partial derivative of E with respect to the u,v coordinates of point I, as follows:

$$\frac{\partial E}{\partial u_i} = 0$$

$$\frac{\partial E}{\partial v_i} = 0$$

where, $$\frac{\partial E}{\partial u_i} = (u_i - x_i) + \frac{\lambda^2 (u_i - u_{i+1})}{d(O_i, O_{i+1})} + \frac{\lambda^2 (u_i - u_{i-1})}{d(O_i, O_{i-1})} + \gamma^2 P \cdot m_i = 0$$

$$\frac{\partial E}{\partial v_i} = (v_i - y_i) + \frac{\lambda^2 (v_i - v_{i+1})}{d(O_i, O_{i+1})} + \frac{\lambda^2 (v_i - v_{i-1})}{d(O_i, O_{i-1})} + \gamma^2 P \cdot l_i = 0$$

Here,
$O_i$=point located on transposed curve at $(u_i, v_i)$; and
d is the distance between point P located at (x, y) and point Q located at (x', y'), defined as:

$$d(P, Q) = \sqrt{(x-x')^2 + (y-y')^2}$$

The solution of the series of equations can be solved using a number of techniques known to those skilled in the art. For example, the solution may be generated using gradient descent methods as follows:

$$u_i^{k+1} = u_i^k - \epsilon \left( \frac{\partial E}{\partial u_i} \right)$$

$$v_i^{k+1} = v_i^k - \epsilon \left( \frac{\partial E}{\partial v_i} \right)$$

where,
$\epsilon$ is a constant whose value may be based on a second derivative of E, and;
k is an iteration counter such that the next u and v values are generated based in part on the current values of u and v.

The above numerical methods iteratively solve for the transposed curve with the lowest energy value E. Such transposed curve is selected as the smoothed curve. Based on the smoothing function associated with the smoothed curve and the points on the drawn curve, the points of the smooth curve are generated. In this manner, the process 200 smooths the drawn curve 100 without affecting the overall shape of the intended curve. Further, the process 200 smooths the drawn curve 100 without shrinking the actual curve radius.

Although two exemplary approximations for the enclosed area are discussed, any other approximations may be used. Moreover, the invention may be implemented in digital hardware or computer software, or a combination of both. Preferably, the invention is implemented in a computer program executing in a computer system. Such a computer system may include a processor, a data storage system, at least one input device, and an output device. FIG. illustrates one such computer system 600, including a processor (CPU) 610, a RAM 620, a ROM 622 and an I/O controller 630 coupled by a CPU bus 698. The I/O controller 630 is also coupled by an I/O bus 650 to input devices such as a keyboard 660, a mouse 670, and output devices such as a monitor 680. Additionally, one or more data storage devices 692 is connected to the I/O bus via an I/O interface 690.

Further, variations to the basic computer system of FIG. 4 are within the scope of the present invention. For example, instead of using a mouse as the input devices, and a pressure-sensitive pen or tablet may be used to generate the curve location information.

It will be apparent to those skilled in the art that various modifications can be made to the curve smoothing process of the instant invention without departing from the scope and spirit of is the invention, and it is intended that the present invention cover modifications and variations of the curve smoothing process of the invention provided they come within the scope of the appended claims and their equivalents.

What is claimed is:

1. A computer-implemented method for generating a smoothed curve from a drawn curve, comprising:
   defining an energy constraint associated with the drawn curve, the energy constraint having a shrink component, a distortion component, and a smoothness component; and
   generating the smoothed curve by minimizing the energy constraint.

2. The method of claim 1, wherein the energy constraint E is:

$$E = D + \lambda^2 * S + \gamma^2 * B$$

where D is the distortion component, $\lambda$ is a smoothness parameter, S is the smoothness component, $\gamma$ is a shrink parameter and B is the shrink component.

3. The method of claim 1, wherein the shrink component is defined as a function of the signed area enclosed between the drawn curve and the smoothed curve.

4. The method of claim 1, wherein the shrink component is defined as the square of the area enclosed between the drawn curve and the smoothed curve.

5. The method of claim 3, wherein the drawn curve includes one or more points and the smoothed curve includes one or more corresponding smoothed points, further comprising approximating the enclosed area as the sum of areas enclosed between consecutive points on the drawn curve and the corresponding smoothed points.

6. The method of claim 5, wherein the area enclosed between consecutive points on the drawn curve and the corresponding smoothed points is determined by:

$$\text{Area}_i = (x_{i+1} - x_i, y_{i+1} - y_i) \times (u_i - x_i, v_i - y_i)$$

where $(x_i, y_i)$ represent a point on the drawn curve, $(u_i, v_i)$ represent a point on the smoothed curve, and X is the vector cross product.

7. The method of claim 5, wherein the area enclosed between consecutive points on the drawn curve and the corresponding smoothed points is determined by:

$$\text{Area}_i = (x_{i+1} - x_i, y_{i+1} - y_i) \times ((u_i - x_i, v_i - y_i) + (u_{i+1} - x_{i+1}, v_{i+1} - y_{i+1}))$$

where $(x_i, y_i)$ represent a point on the drawn curve, $(u_i, v_i)$ represent a point on the smoothed curve, and X is the vector cross product.

8. The method of claim 1, wherein the energy constraint is minimized using a gradient descent method.

9. A computer-implemented apparatus for generating a smoothed curve from a drawn curve, the apparatus comprising instructions operable to cause a programmable processor to:
   define an energy constraint associated with the drawn curve, the energy constraint having a shrink component, a distortion component, and a smoothness component; and
   generate the smoothed curve by minimizing the energy constraint.

10. The apparatus of claim 9, wherein the energy constraint E is:

$$E = D + \lambda^2 * S + \gamma^2 * B$$

where D is the distortion component, $\lambda$ is a smoothness parameter, S is the smoothness component, $\gamma$ is a shrink parameter and B is the shrink component.

11. The apparatus of claim 9, wherein the shrink component is defined as a function of the area enclosed between the drawn curve and the smoothed curve.

12. The apparatus of claim 9, wherein the shrink component is defined as the square of the area enclosed between the drawn curve and the smoothed curve.

13. The apparatus of claim 11, wherein the drawn curve includes one or more points and the smoothed curve includes one or more corresponding smoothed points, further comprising instructions to approximate the enclosed area as the sum of areas enclosed between consecutive points on the drawn curve and the corresponding smoothed points.

14. The apparatus of claim 13, wherein the area enclosed between consecutive points on the drawn curve and the corresponding smoothed points is determined by:

$$\text{Area}_i = (x_{i+1} - x_i, y_{i+1} - y_i) \times (u_i - x_i, v_i - y_i)$$

where $(x_i, y_i)$ represent a point on the drawn curve, $(u_i, v_i)$ represent a point on the smoothed curve, and X is the vector cross product.

15. The apparatus of claim 13, wherein the area enclosed between consecutive points on the drawn curve and the corresponding smoothed points is determined by:

$$\text{Area}_i = (x_i - x_i, y_{i+1} - y_i) \times ((u_i - x_i, v_i - y_i) + (u_{i+1} - x_i, v_{i+1} - y_{i+1}))$$

here $(x_i, y_i)$ represent a point on the drawn curve, $(u_i, v_i)$ represent a point on the smoothed curve, and X is the vector cross product.

16. The apparatus of claim 9, wherein the energy constraint is minimized using a gradient descent method.

17. The apparatus of claim 9, wherein the energy constraint is minimized iteratively.

18. A computer system for characterizing a drawn curve defined by a sequence of points on a two-dimensional space, comprising:

a display;

a user input device; and a processor coupled to the display and the user input device, the processor having instructions embedded therein to:

determine a distortion component D associated with the smoothed curve in accordance with $$D = \sum_{i=0}^{N-1} ((u_i - x_i)^2 + (v_i - y_i)^2)$$

where $(x_i, y_i)$ represent a point on the drawn curve $(u_i, v_i)$ represent a point on the smoothed curve;

determine a smoothing component S associated with the smoothed curve in accordance with:

$$S = \sum_{i=0}^{N-1} \sqrt{(u_i - u_{i+1})^2 + (v_i - v_{i+1})^2}$$

determine a shrink component B for a systematic shift in accordance with:

$$B = \left[\sum_{i=1}^{N-1} (v_i \cdot l_i + u_i \cdot m_i) + M\right]^2$$

and generate one or more smoothed curves, each curve having an energy value E expressed in terms of the distortion component, the smoothing component and the shrink component in accordance with:

$$E = D + \lambda^2 * S + \gamma^2 * B$$

where $\lambda$ is the smoothness parameter, $\gamma$ is the distortion parameter; and select the smoothed curve with the minimum energy as the smoothed curve.

19. The computer system of claim 18, wherein the energy function E is minimized in accordance with:

$$\frac{\partial E}{\partial u_i} = (u_i - x_i) + \frac{\lambda^2(u_i - u_{i+1})}{d(O_i, O_{i+1})} + \frac{\lambda^2(u_i - u_{i-1})}{d(O_i, O_{i-1})} + \gamma^2 P \cdot m_i = 0$$

$$\frac{\partial E}{\partial v_i} = (v_i - y_i) + \frac{\lambda^2(v_i - v_{i+1})}{d(O_i, O_{i+1})} + \frac{\lambda^2(v_i - v_{i-1})}{d(O_i, O_{i-1})} + \gamma^2 P \cdot l_i = 0$$

where, $O_i$ = point located on smoothed curve at $(u_i, v_i)$; and d (P, Q) is the distance between point P located at (x, y) and point Q located at (x', y'), defined as:

$$d(P, Q) = \sqrt{(x-x')^2 + (y-y')^2}.$$

20. The computer system of claim 18, wherein the energy value is iteratively evaluated for the one or more smoothed curves.

21. The computer system of claim 18, wherein the drawn curve is computer generated.

22. An apparatus for generating a smoothed curve from a drawn curve, comprising:

means for defining an energy constraint associated with the drawn curve, the energy constraint having a shrink component, a distortion component, and a smoothness component; and means for generating the smoothed curve by minimizing the energy constraint.

23. A computer-implemented method for generating a smoothed curve from a drawn curve, comprising:

defining an energy constraint associated with the drawn curve, the energy constraint having a shrink component; and generating the smoothed curve by minimizing the energy constraint.

24. The method of claim 23, wherein the energy constraint further comprises a distortion component.

25. The method of claim 23, wherein the energy constraint further comprises a smoothness component.

26. A computer readable medium with instructions for generating a smoothed curve from a drawn curve, the medium comprising instructions operable to cause a programmable processor to:

define an energy constraint associated with the drawn curve, the energy constraint having a shrink component, a distortion component, and a smoothness component; and generate the smoothed curve by minimizing the energy constraint.

27. The computer readable medium of claim 26, wherein the energy constraint E is:

$$E = D + \lambda^2 * S + \gamma^2 * B$$

where D is the distortion component, $\lambda$ is a smoothness parameter, S is the smoothness component, $\gamma$ is a shrink parameter and B is the shrink component.

28. The computer readable medium of claim 27, further comprising instructions operable to:

determine a distortion component D associated with the smoothed curve in accordance with:

$$D = \sum_{i=0}^{N-1} ((u_i - x_i)^2 + (v_i - y_i)^2)$$

where $(x_i, y_i)$ represent a point on the drawn curve and $(u_i, v_i)$ represent a point on the smoothed curve;

determine a smoothing component S associated with the smoothed curve in accordance with:

$$S = \sum_{i=0}^{N-1} \sqrt{(u_i - u_{i+1})^2 + (v_i - v_{i+1})^2}$$

and, determine a shrink component B for a systematic shift in accordance with:

$$B = \left[\sum_{i=1}^{N-1}(v_i \cdot l_i + u_i \cdot m_i) + M\right]^2.$$

29. The computer readable medium of claim 27, wherein the energy function E is minimized in accordance with:

$$\frac{\partial E}{\partial u_i} = (u_i - x_i) + \frac{\lambda^2(u_i - u_{i+1})}{d(O_i, O_{i+1})} + \frac{\lambda^2(u_i - u_{i-1})}{d(O_i, O_{i-1})} + \gamma^2 P \cdot m_i = 0$$

$$\frac{\partial E}{\partial v_i} = (v_i - y_i) + \frac{\lambda^2(v_i - v_{i+1})}{d(O_i, O_{i+1})} + \frac{\lambda^2(v_i - v_{i-1})}{d(O_i, O_{i-1})} + \gamma^2 P \cdot l_i = 0$$

where, $O_i$=point located on smoothed curve at $(u_i, v_i)$; and d(P, Q) is the distance between point P located at (x, y) and point Q located at (x',y'), defined as:

$$d(P,Q)=\sqrt{(x-x')^2+(y-y')^2}.$$

30. The computer readable medium of claim 26, wherein the shrink component is defined as the square of the area enclosed between the drawn curve and the smoothed curve.

31. The computer readable medium of claim 26, wherein the shrink component is defined as a function of the area enclosed between the drawn curve and the smoothed curve.

32. The computer readable medium of claim 31, wherein the drawn curve includes one or more points and the smoothed curve includes one or more corresponding smoothed points, further comprising instructions to approximate the enclosed area as the sum of areas enclosed between consecutive points on the drawn curve and the corresponding smoothed points.

33. The computer readable medium of claim 32, wherein the area enclosed between consecutive points on the drawn curve and the corresponding smoothed points is determined by:

Area$_i$=($x_{i+1}$-$x_i$, $y_{i+1}$-$y_i$)×($u_i$-$x_i$, $v_i$-$y_i$)

where $(x_i, y_i)$ represent a point on the drawn curve, $(u_i, v_i)$ represent a point on the smoothed curve, and X is the vector cross product.

34. The computer readable medium of claim 32, wherein the area enclosed between consecutive points on the drawn curve and the corresponding smoothed points is determined by:

Area$_i$=($x_{i+1}$-$x_i$, $y_{i+1}$-$y_i$) ×(($u_i$-$x_i$, $v_i$-$y_i$)+($u_{i+1}$-$x_{i+1}$, $v_{i+1}$-$y_{i+1}$))

where $(x_i, y_i)$ represent a point on the drawn curve, $(u_i, v_i)$ represent a point on the smoothed curve, and X is the vector cross product.

35. The computer readable medium of claim 26, wherein the energy constraint is minimized using a gradient descent method.

36. The computer readable medium of claim 26, wherein the energy constraint is minimized iteratively.

37. The computer readable medium of claim 26, wherein the energy function E is minimized in accordance with:

$$\frac{\partial E}{\partial u_i} = (u_i - x_i) + \frac{\lambda^2(u_i - u_{i+1})}{d(O_i, O_{i+1})} + \frac{\lambda^2(u_i - u_{i-1})}{d(O_i, O_{i-1})} + \gamma^2 P \cdot m_i = 0$$

$$\frac{\partial E}{\partial v_i} = (v_i - y_i) + \frac{\lambda^2(v_i - v_{i+1})}{d(O_i, O_{i+1})} + \frac{\lambda^2(v_i - v_{i-1})}{d(O_i, O_{i-1})} + \gamma^2 P \cdot l_i = 0$$

where, $O_i$=point located on smoothed curve at $(u_i, v_i)$; and d(P, Q) is the distance between point P located at (x, y) and point Q located at (x',y'), defined as:

$$d(P,Q)=\sqrt{(x-x')^2+(y-y')^2}.$$

38. The computer readable medium of claim 26, wherein the drawn curve is computer generated.

39. The method of claim 1, wherein the energy constraint is minimized iteratively.

40. A computer-implemented method for characterizing a drawn curve defined by a sequence of points on a two-dimensional space, comprising:

determining a distortion component D associated with the smoothed curve in accordance with:

$$D = \sum_{i=0}^{N-1}((u_i - x_i)^2 + (v_i - y_i)^2)$$

where $(x_i, y_i)$ represent a point on the drawn curve and $(u_i, v_i)$ represent a point on the smoothed curve;

determining a smoothing component S associated with the smoothed curve in accordance with:

$$S = \sum_{i=0}^{N-1}\sqrt{(u_i - u_{i+1})^2 + (v_i - v_{i+1})^2}$$

determining a shrink component B for a systematic shift in accordance with:

$$B = \left[\sum_{i=1}^{N-1}(v_i \cdot l_i + u_i \cdot m_i) + M\right]^2$$

and generating one or more smoothed curves, each curve having an energy value E expressed in terms of the distortion component, the smoothing component and the shrink component in accordance with:

$$E=D+\lambda^2*S+\gamma^2*B$$

where $\lambda$ is the smoothness parameter, $\gamma$ is the distortion parameter; and selecting the smoothed curve with the minimum energy as the smoothed curve.

41. The method of claim 40, wherein the energy function E is minimized in accordance with:

$$\frac{\partial E}{\partial u_i} = (u_i - x_i) + \frac{\lambda^2(u_i - u_{i+1})}{d(O_i, O_{i+1})} + \frac{\lambda^2(u_i - u_{i-1})}{d(O_i, O_{i-1})} + \gamma^2 P \cdot m_i = 0$$

$$\frac{\partial E}{\partial v_i} = (v_i - y_i) + \frac{\lambda^2(v_i - v_{i+1})}{d(O_i, O_{i+1})} + \frac{\lambda^2(v_i - v_{i-1})}{d(O_i, O_{i-1})} + \gamma^2 P \cdot l_i = 0$$

where, $O_i$=point located on smoothed curve at $(u_i, v_i)$; and d(P, Q) is the distance between point P located at (x, y) and point Q located at (x', y'), defined as:

$$\sqrt{d(P,Q)}=\sqrt{(x-x')^2+(y-y')^2}.$$

42. The method of claim 40, wherein the energy value is iteratively evaluated for the one or more smoothed curves.

43. The method of claim 40, wherein the drawn curve is computer generated.

44. A computer-implemented method for generating a smoothed curve from a drawn curve, comprising:
defining an energy constraint associated with the drawn curve, the energy constraint having a shrink component and at least one of a distortion component and a smoothness component; and
generating the smoothed curve by minimizing the energy constraint.

45. The method of claim 44, wherein the shrink component is defined as the square of the area enclosed between the drawn curve and the smoothed curve.

46. The method of claim 44, wherein the shrink component is defined as a function of the signed area enclosed between the drawn curve and the smoothed curve.

47. The method of claim 46, wherein the drawn curve includes one or more points and the smoothed curve includes one or more corresponding smoothed points, further comprising approximating the enclosed area as the sum of areas enclosed between consecutive points on the drawn curve and the corresponding smoothed points.

48. The method of claim 47, wherein the area enclosed between consecutive points on the drawn curve and the corresponding smoothed points is determined by:

$$\text{Area}_i = (x_{i+1} - x_i, y_i) \times (u_i - x_i, v_i - y_i)$$

where $(x_i, y_i)$ represent a point on the drawn curve, $(u_i, v_i)$ represent a point on the smoothed curve, and X is the vector cross product.

49. The method of claim 47, wherein the area enclosed between consecutive points on the drawn curve and the corresponding smoothed points is determined by:

$$\text{Area}_i = (x_{i+1} - x_i, y_{i+1} - y_i) \times ((u_i - x_i, v_i - y_i) + (u_{i+1} - x_{i+1}, v_{i+1} - y_{i+1}))$$

where $(x_i, y_i)$ represent a point on the drawn curve, $(u_i, v_i)$ represent a point on the smoothed curve, and X is the vector cross product.

50. The method of claim 44, wherein the energy constraint is minimized using a gradient descent method.

51. The method of claim 44, wherein the energy constraint is minimized iteratively.

* * * * *

UNITED STATES PATENT AND TRADEMARK OFFICE
CERTIFICATE OF CORRECTION

PATENT NO. : 6,462,739 B1
DATED : October 8, 2002
INVENTOR(S) : Naresh C. Gupta

It is certified that error appears in the above-identified patent and that said Letters Patent is hereby corrected as shown below:

Title page,
Item [73], Assignee, please replace "Abode Systems Incorporated" with -- Adobe Systems Incorporated --.

Column 10,
Line 14, replace

" $Area_i = (x_{i+1} x_i, y_{i+1} - y_i) X ((u_i - x_i, v_i - y_i) + (u_{i+1} - x_{i+1}, v_{i+1} - y_{i+1}))$ " with
-- $Area_i = (x_{i+1} - x_i, y_{i+1} - y_i) X ((u_i - x_i, v_i - y_i) + (u_{i+1} - x_{i+1}, v_{i+1} - y_{i+1}))$ --

Line 64, replace

" $Area_i = (x_i - x_i, y_{i+1} - y_i) X ((u_i - x_i, v_i - y_i) + (u_{i+1} - x_i, v_{i+1} - y_{i+1}))$ " with
-- $Area_i = (x_{i+1} - x_i, y_{i+1} - y_i) X ((u_i - x_i, v_i - y_i) + (u_{i+1} - x_{i+1}, v_{i+1} - y_{i+1}))$ --

Column 14,
Line 66, replace

" $\sqrt{d(P,Q)} = \sqrt{(x - x')^2 + (y - y')^2}.$ " with -- $d(P,Q) = \sqrt{(x - x')^2 + (y - y')^2}.$ --

Column 16,
Line 5, replace " $Area_i = (x_{i+1} - x_i, y_i) X (u_i - x_i, v_i - y_i)$ " with
-- $Area_i = (x_{i+1} - x_i, y_{i+1} - y_i) X (u_i - x_i, v_i - y_i)$ --.

Signed and Sealed this

First Day of April, 2003

JAMES E. ROGAN
*Director of the United States Patent and Trademark Office*